Jan. 22, 1952          G. FIELDS          2,583,168

WASHING MACHINE AND TRANSMISSION THEREFOR

Filed Feb. 16, 1946          7 Sheets-Sheet 1

INVENTOR
GEORGE FIELDS
BY
J. D. Douglass
ATTY.

Jan. 22, 1952 G. FIELDS 2,583,168
WASHING MACHINE AND TRANSMISSION THEREFOR
Filed Feb. 16, 1946 7 Sheets-Sheet 2

INVENTOR
GEORGE FIELDS
BY
J. V. Douglas
ATTY.

Jan. 22, 1952           G. FIELDS           2,583,168

WASHING MACHINE AND TRANSMISSION THEREFOR

Filed Feb. 16, 1946           7 Sheets-Sheet 3

INVENTOR
GEORGE FIELDS
BY
J. D. Douglas
ATTY.

Jan. 22, 1952  G. FIELDS  2,583,168
WASHING MACHINE AND TRANSMISSION THEREFOR
Filed Feb. 16, 1946  7 Sheets-Sheet 4

INVENTOR
GEORGE FIELDS
BY
J. D. Douglass
ATTY.

INVENTOR
GEORGE FIELDS
BY
J. D. Douglas
ATTY.

Jan. 22, 1952     G. FIELDS     2,583,168
WASHING MACHINE AND TRANSMISSION THEREFOR
Filed Feb. 16, 1946     7 Sheets-Sheet 7

INVENTOR
GEORGE FIELDS
BY
J. D. Douglass
ATTY.

UNITED STATES PATENT OFFICE 2,583,168

WASHING MACHINE AND TRANSMISSION THEREFOR

George Fields, Wilmette, Ill., assignor to Admiral Corporation, Chicago, Ill., a corporation of Delaware Application February 16, 1946, Serial No. 648,117

18 Claims. (Cl. 68—23)

This invention relates to improvements in transmissions, and more particularly to an improved power transmission for transmitting power from a source to one or more places where it is used.

The present invention is particularly useful in connection with a power drive for a washing machine and, therefore, will be described in connection with that particular application. It will be appreciated, however, that it is useful for transmitting power to places and apparatus other than washing machines, and therefore is not, in its broader sense, limited to the specific application described, the description being for the purpose of clarity of disclosure rather than of limitation. In its broader aspects, a continuously rotating driving member is provided which is frictionally connected to a first driven member which has means directly connected thereto to utilize the driving effort. This frictional drive is effected by means of a self tightening band which may be loosened to cause slippage between the frictional connections. The driven member is frictionally coupled to a second driven member, which coupling can be conditioned to either a driving or a released position. This member is adapted to have power taken therefrom whereby a means may be driven or stay idle, depending on the condition desired. A brake is also provided to hold said member in its idle position.

Through this mechanism, one member can be driven independent of the other, or both driven together, and during the shift from the drive from one member to two members, the drive to the first member is a slipping frictional drive which prevents the application of a heavy overload to the driving member.

In greater detail, the present invention comprehends a drive mechanism for use in connection with a washing machine, such as is described in my copending application, Serial No. 620,209, now Patent No. 2,568,614. This machine may be of the so-called automatic type comprising a receptacle to carry soiled clothes, and an agitator for moving a washing detergent through the clothes. After the washing operation has been carried on for a certain predetermined period, the detergent is removed from the clothes by centrifugal force. This is carried out by spinning the clothes carrying receptacle at a high rate of speed. Afterwards, rinse water may be flowed through the clothes by means of the agitator and later removed by the spinning operation previously referred to. In order that the two foregoing operations of agitating and spinning may be performed, two distinct applications of mechanical motion must be provided. Therefore, it is for transmitting continuous motion from a suitable source, such as an electric motor to two separate loads with which the present invention is concerned. In the case about to be described, one load is for the purpose of agitation of the clothes, and the other load for centrifuging the clothes.

Heretofore, the mechanisms for operating washing machines agitators have been somewhat complicated, including intricate gear trains and were relatively expensive to manufacture. Since the cost of manufacture was high, this necessarily made the retail price of the machine high.

By my present invention I have provided a mechanism wherein I am able to drive the agitator independently of the receptacle which holds the garments and to additionally drive the receptacle, together with the agitator, at a speed such that the washing detergent or other fluid may be largely removed from the fabrics by centrifugal force. This, I am able to do by a novel combination of clutches and a brake which are simple and inexpensive to manufacture. Additionally, I take advantage of the inertia in the moving parts of the receptacle to carry out certain controlling operations in the power transmitter so that use of certain supplementary control apparatus is unnecessary. Consequently, my improved features enable me to make washing machines on a more economical basis and thus place them in a lower price range.

The manner of operation and the construction of the apparatus, as well as certain advantages due to the construction, will become more apparent from the following description of an embodiment thereof, the description being illustrated by the accompanying drawings and forming a part of this specification.

In the description to follow, the process of causing a detergent to flow over and through soiled fabrics by means of an agitator, and the process of causing rinse water to similarly flow relative to the fabrics, will both be referred to as the washing process. Also, since a specialized laundry machine for relieving wet clothes of their liquid by centrifugal force is known as an extractor, the process of removing liquid from the contents of the receptacle will be hereinafter referred to as extraction.

Figures 1, 2:
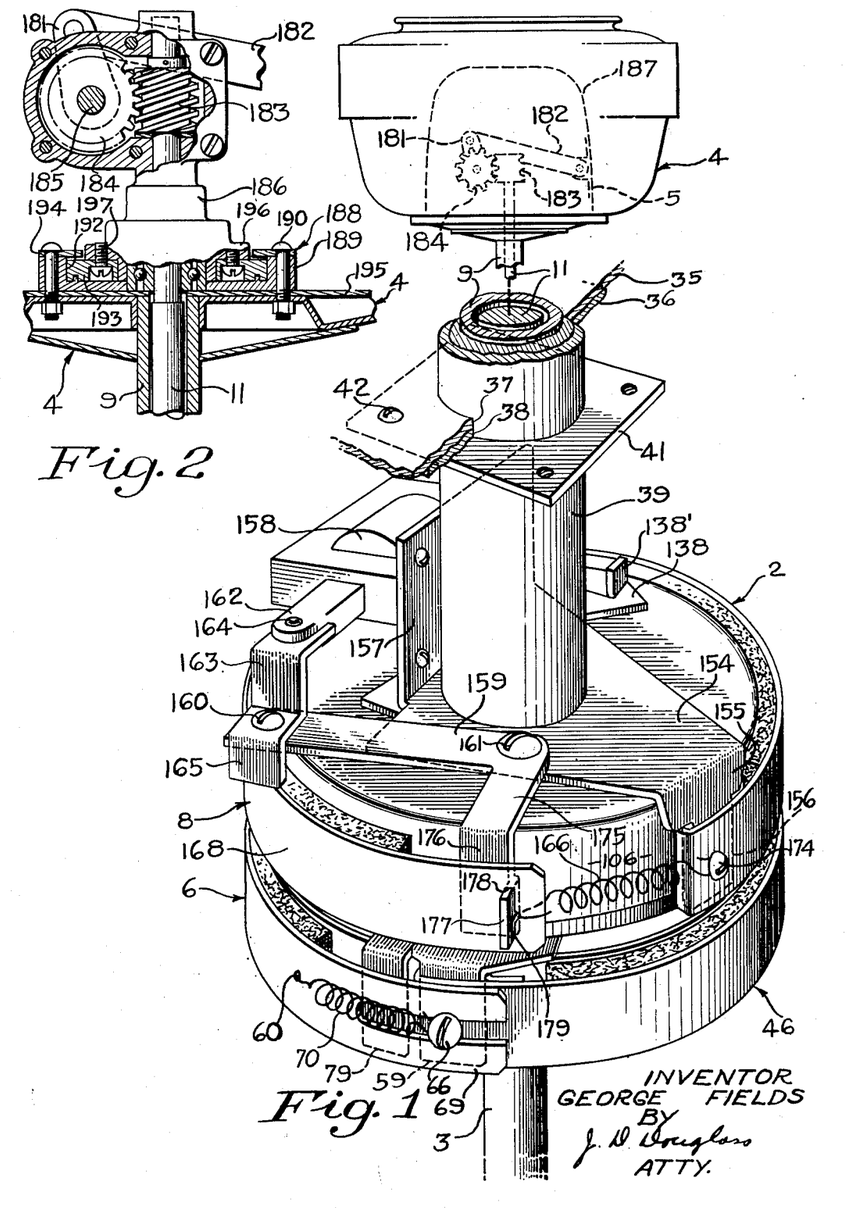
Fig. 1 is a perspective view of a mechanism embodying my invention, together with a tub and agitator illustrated in front elevation and on a reduced scale.
Fig. 2 is a fragmentary vertical section showing elements of the agitator and its connection to the receptacle.
Figure 3:
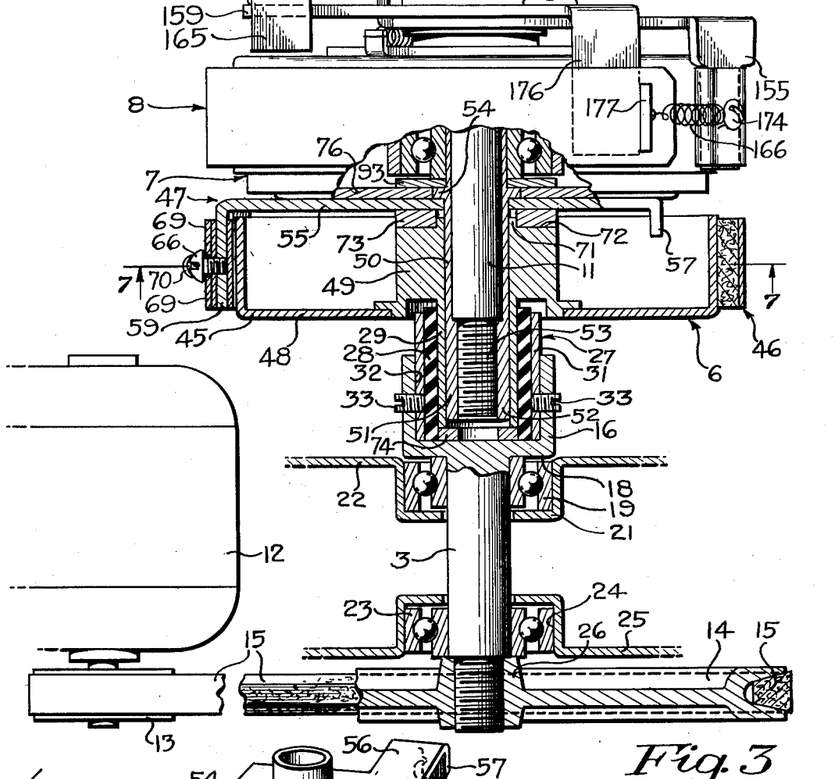
Fig. 3 is a fragmentary view of the power transmitter, certain parts being shown in section and others broken away to disclose the construction of underlying details, the motor being shown in fragmentary elevation.
Figures 5, 6:
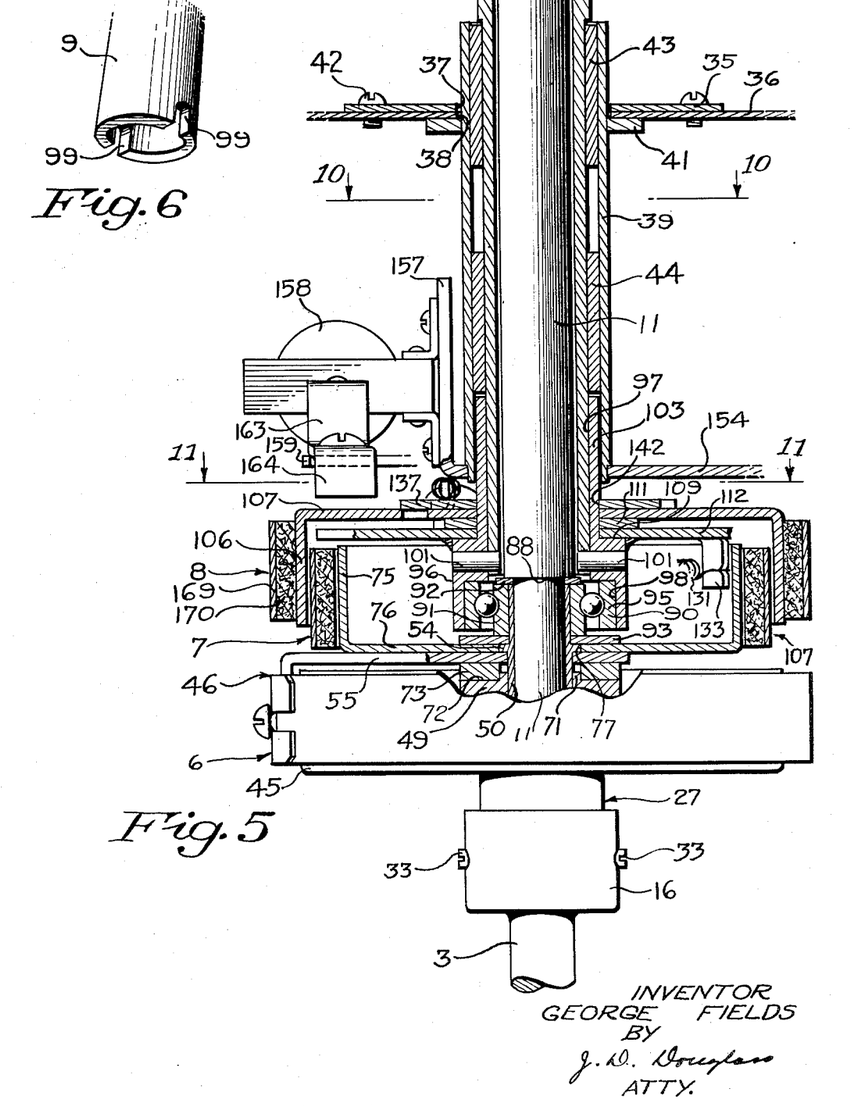
Fig. 5 is a vertical sectional view of the power transmitter with the lower clutch shown in elevation.
Fig. 6 is a perspective view of the lower end of the tubular drive shaft which supports the receptacle.

The specific embodiment of the invention, indicated in Fig. 1, is referred to in its entirety by the reference character 2. This mechanism is used to transmit motion from a drive shaft 3 to the members of a washing machine including a rotatable receptacle 4 and an agitator 5 within the receptacle. In order that this may be carried into effect, a lower clutch 6, better shown in Fig. 3, is drivingly coupled to a second clutch 7 (Fig. 5). The operations of the respective clutches are further supplemented by a brake 8. The motion conveyed by the mechanism is communicated to the receptacle 4 by means of a tubular shaft or sleeve 9, while a shaft 11, within the sleeve, communicates motion to the agitator 5.

Motive power to drive the washing machine may be derived from any suitable source, such as an electric motor 12 (Fig. 3), having a pulley 13 thereon. On the shaft 3 is rigidly mounted a sheave 14, adapted to receive a belt 15, also passing over the motor pulley 13. Upwardly the shaft 3 includes a section of enlarged diameter 16 in the form of a cup, thereby providing a shoulder 18. The shoulder rests against a bearing 19, pocketed within a distended portion 21 of a frame or housing member 22. The bearing 19 thus resists downward thrust of the shaft. Upward thrust of the shaft is resisted by a bearing 23 confined between a pocket 24 of an additional frame member 25 and a hub 26 on the sheave 14.

It is advisable that provision be made for lateral motion of the receptacle 4. A flexible coupling 27 is therefore included between the shaft 3 and the clutch 6. The coupling involves use of a rubber sleeve 28 mounted on a hub extension 29 of the clutch drum 6. If desired, the sleeve 28 may be bonded in adhesion with the extension 29. The sleeve may be similarly associated with a collar 31, embracing the sleeve. The collar 31 is assembled in intimate relationship with a bore 32, within the cup 16 of the shaft, set screws 33 being used to positively tie the collar to the enlarged portion of the shaft.

Additional means are provided to support the shafts 9 and 11 (Fig. 1) in substantially vertical position. This is effected by supplying supports for the shafts between the brake 8 and the receptacle 4. The supporting members for the shafts include metal straps 35 and 36 disposed in transverse relationship to the other and which are connected to the frame to resist lateral movement of the shafts. The mode of anchoring the straps to other parts of the machine will not be described, however, since this feature is no part of the present invention. The frame members 35 and 36 are apertured at 37 and 38 (Fig. 5) to accommodate a vertical tubular support 39. The support, having a flange 41 thereon, is bolted to the straps 35 and 36 by screws 42 that pass through the flange and straps. The sleeve 9 is spaced from the support 39 by sleeve bearings 43 and 44.

Figure 4:
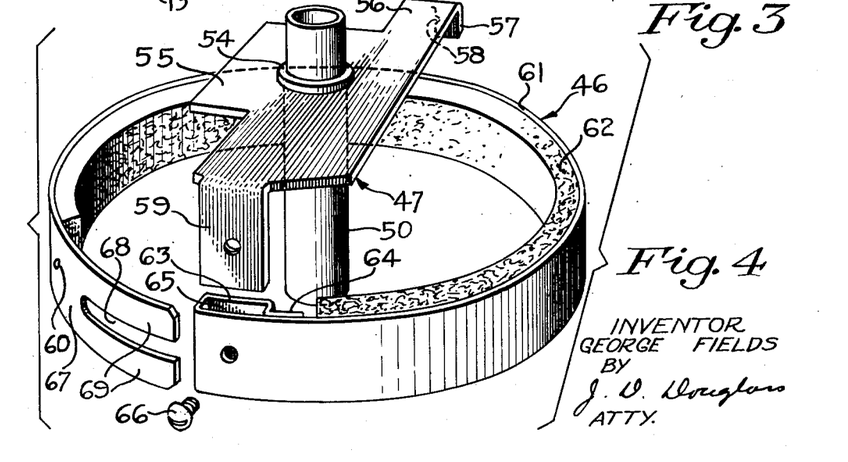
Fig. 4 is an exploded view of the driven member of the lower clutch, in addition to the driver, in disassembled relation.

A state of constant drivability is normally provided by the clutch 6 (Fig. 3) between the shafts 3 and 11. This condition is maintained by means of clutch members comprising a driving member including a drum 45 connected by a friction member 46 to a driven member 47 which supports the shaft 11 to convey rotary motion from the shaft 3 to the shaft 11. The drum 45 is provided with a web 48 having centrally thereof the hub 49, of which the extension 29 may be an integral part. The driven member 47 (Figs. 3 and 4) comprises a sleeve 50 having the lower extremity thereof at 51, of reduced internal diameter and threaded to provide a socket 52, adapted to receive therein the threaded extremity 53 of the shaft 11, which is secured therein. The driven member 47 is thereby drivingly associated with the shaft. Integral with the sleeve 50 and toward its upper extremity is a flange or collar 54. The sleeve also extends through driven member 47 which is rigidly secured to said member in any suitable manner such as by welding.

Figure 8:
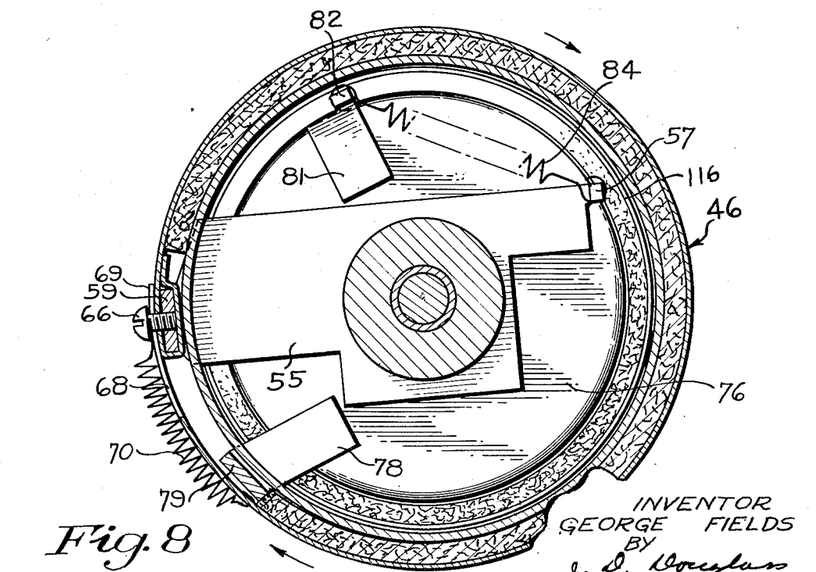
Fig. 8 is a similar view wherein the clutch release arm has been rotated relative to the upper member against resistance of the coupling spring to release the clutch.

The member 47 includes a body 55 of generally rectangular conformation and may be of heavy gauge metal. At one corner thereof it has an extending arm 56 terminating in a downwardly extending lug 57 which is notched laterally thereof at 58 to provide anchorage for a tension spring (Fig. 8). At the opposite end of the body 55, there is provided a downwardly extending finger 59, adapted to be attached to the clutch band 46. The clutch band comprises a resilient metal band 61 to which is conveniently secured a lining 62. The lining is of some suitable friction material such as used on brake shoes and consequently adapted to provide frictional engagement between the drum 45 and the member 46, when the band 61 is tensioned about the drum. One of the extremities of the band 61 is bent backward at 63 to form a loop 65 adapted to receive the finger 59. The finger 59 is secured in the loop by a screw 66 that passes through the outer side of the loop and is threaded into the finger 59. The screw 66 does not extend through the inner portion of the loop and is of such a length that when in place, its head is in spaced relationship with the band 61. This is to provide means by which the remaining extremity 67 of the band may be slidably anchored to the arm 55. In greater detail the extremity 67 is bifurcated by a slot 68 to provide a pair of tongues 69. The tongues straddle the screw 66 and are retained in slidable relationship therewith by the head of the screw, the head serving to hold the tongues against the other extremity of the band 61. This construction will be noted in Fig. 1, wherein it will also be observed that a tension spring 70 draws the respective ends of the band 61 together in overlapping slidable relation since one end of the spring is anchored to the screw 66 and the remaining spring end is anchored in a hole 60.

Provision is made for tieing the parts of clutch 6 in axial association with each other. It involves use of a neck 71, (Fig. 3) of reduced diameter, extending from a shoulder 72 on the hub 49. The hub is separated from the arm 55 by a bearing washer 73, of width substantially greater than the length of the neck 71, on which the washer 73 is mounted. Additional support includes a washer 74, between the bottom of the cup 16 and end of hub extension 29.

In the normal operation of the motor 12, there is substantially no relative movement or slippage between the drum 45 and the member 46, because the spring 70 holds the band in contact with the drum, and the direction of rotation of the drum is such to increase the frictional engagement of the two, this action being of the so-called servo action. In other words, a state of constant drivability through the clutch 6 is maintained. Therefore, the speed of the shaft 3 is equal to the speed of the shaft 11.

Figure 7:
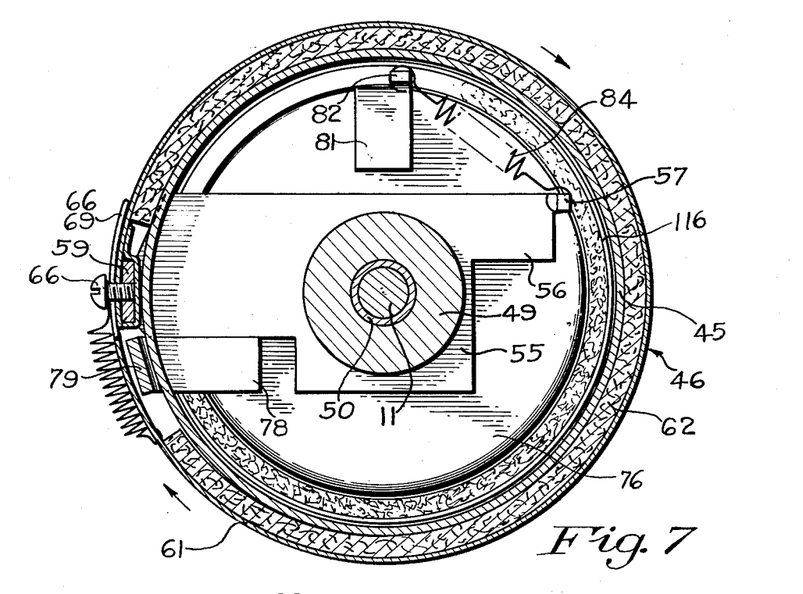
Fig. 7 is section taken on line 7—7 of Fig. 3 to indicate functions of the clutch operating members including the coupling spring which holds the clutch release arm in clutch closed position.
Figure 9:
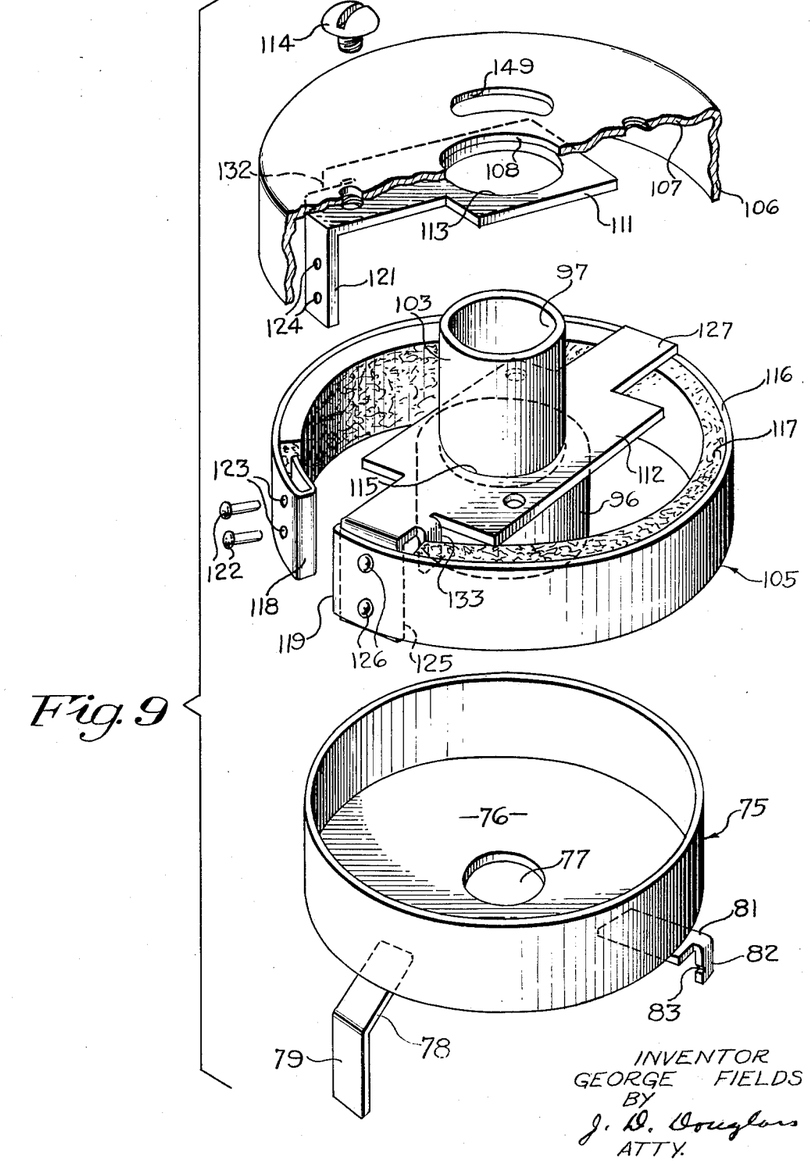
Fig. 9 is an exploded view showing the driving and driven members of the upper clutch together with its associated parts ordinarily associated therewith including the brake drum, broken away to reveal the structure of the upper clutch arms.
Figure 10:
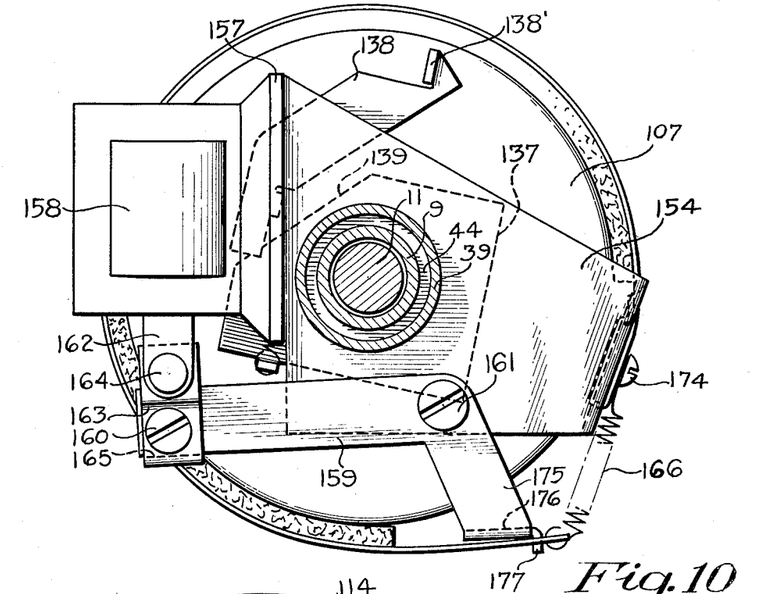
Fig. 10 is a section taken on line 10—10 of Fig. 5 to show the brake and the solenoid for releasing the same.

The clutch 6 and the clutch 7 are so coupled together that when the clutch 7 is engaged to spin the receptacle 4, the clutch band 46 of the clutch 6 is released to allow the clutch to slip. A certain amount of frictional engagement is provided, however, which causes sleeve 9, and hence the receptacle, to rotate. This condition is maintained until eventually the receptacle is rotating at the desired speed which is the full speed. At this time the shaft 11 and sleeve 9 are rotating together. This expedient prevents overload of the motor at the start of the centrifuging operation. That this may be understood, reference is made to Figs. 5 and 9, wherein it will be noted that the second clutch 7, resembling clutch 6, includes a driven member or drum 75, closed at its lower end by a web 76. Centrally thereof, the web has an opening 77 (Fig. 9) adapted to receive therein the periphery of the flange 54, of the sleeve 50, so that the drum 75 is supported in coaxial relationship with the drum 45. To the bottom of the web 76, adjacent the drum portion 75, is rigidly secured an arm 78 which terminates in a downwardly extending finger 79 (Figs. 7 and 9). The arm 78 extends beyond the periphery of the first clutch drum 45, and the finger 79 extends between the band 61 and the drum 45 beyond the end of the lining 62 adapted to be engaged with the lining 62 upon rotation of the drum clockwise relative to the band 46. The web 76 also carries a second arm 81, having a downwardly extending portion 82, that is notched at 83 so that one end of a coupling spring 84 may be hooked thereon. The other end of spring 84 is hooked on the member 57 of the plate 55.

As can best be seen in Fig. 3, the drum 75 rests with its web portion 76 upon the plate 55 carried by the sleeve 50, the drum being held coaxial with the sleeve and hence the first clutch drum by the collar 54 on the sleeve which is disposed in the opening 77 in the drum. As can best be seen in Figs. 7 and 8, which are bottom plan views of the drum 75, the arm 78—79 carried by the drum is normally held in abutting relation against the member 55 by the spring 84 which is attached to the arms 57 and 82 on the member 55 and the drum 75 respectively. In this position, the arm 79 is held out of contact with the end of the lining 62 of the first clutch, but is adapted to be moved into engagement with the end of the lining upon a relative movement between the drum and the member 47 (plate 55) such as to cause the spring 84 to be stretched.

As viewed from below the web 76 as in Fig. 7, the clutch members 45 and 46 are adapted to rotate clockwise. The drive for the drum 75 from the member 47 is through the spring 84 to the drum. During normal operation, when the agitator only is being operated, the drum 75 is free to rotate, and, therefore, the spring 84 retains the arm 78 against the member 55 (Fig. 7), and a substantially positive drive is afforded for the agitator. However, should a load be applied to the drum 75, the spring 84 which is preloaded, that is, it is tensioned to a predetermined pounds of force, which load may be sufficient to cause the spring to stretch, the arm will be moved to the position shown in Fig. 8 wherein the portion 79 engages with the end of the clutch lining 62. That is, the drum 45, its clutch band 46 and the member 47, travel ahead or faster than the drum 75 causing the relative movement, and the arm 79 is effective to release the clutch band 46 causing it to slip and slowing down the agitator drive. If the drum 75 was completely stopped, its connection to the band 46 is such that the member 47 would stop and the drive to the agitator be discontinued. The slippage thus permits the motor 12 to operate in safety without overload. It also provides for gradually increasing the speed of the receptacle until the receptacle has reached full speed. As the load of the receptacle is gradually brought up to full speed, the spring 84 moves the finger 79 away from the lining 62 until the arm 78 is finally in abutment with the arm 55, wherein the band again provides full frictional engagement with the drum 48.

Means are provided to effectively support the drum 75 (Fig. 5) so that it is free to move within certain limits about the flange 54. The shaft 11 has a shoulder 88 thereon, and the diameter of the shaft 11 above the shoulder is greater than the diameter of the portion within the sleeve 50. Between the flange 54 and shoulder 88 is clamped a ball bearing 90, an inner race 91 of which is spaced from the shoulder by a washer 92, while an additional washer 93 spaces the race from the flange 54. Pressure for clamping the bearing between juxtaposed parts is provided by screwing the shaft 11 into the sleeve 51 (Fig. 3) on the flange 54 exerting pressure against the shoulder 88 through bearing 90 and washers 92 and 93. In the operation of driving the agitator, this clamping action may be improved, since resistance to rotation of shaft 3 by shaft 11 tends to augment the clamped status of bearing 90, owing to the direction of the threads on members 52 and 53. But the thickness of the web 76 is slightly less than the thickness of the flange 54. This permits the drum 75 to turn freely between the washer 93 and arm 55, except as limited by the spring 84 already referred to.

The ball bearing 90 also carries the load of the receptacle 4. That this may be accomplished, an outer race 95 of the bearing, although of a width substantially equal to the width of the inner race 91, is disposed at a level slightly above the level of the race 91. This is to afford clearance between race 95 and the washer 93. It also is to support an adapter 96, to which sleeve 9 is releasably coupled. The upper end of the adapter 96 is provided with a bore 97 in which is received the lower extremity of the sleeve 9. The lower extremity of the adapter is provided with a counterbore 98, in concentric relationship to the bore 97, in which is received the outer race 95 of bearing 90.

The sleeve 9 has its opposite sides notched at 99 (Fig. 6), adapted to fit over a pair of diametrically opposed pins 101 extending inwardly of the bore 97. In addition, the adapter 96 is of sufficiently reduced external diameter to be readily accommodated within the support 39. The support, on the other hand, carries the sleeve bearings 43 and 44, already referred to.

It will be noted that there are several forces operating which effect the functioning of the lower clutch. The drive for the agitator shaft 11 is from the lower drum to the band and through the end of the band 46 to the member 47—55, the member 47 being rotated due to its connection to the loop 65 of the band.

The band 46 is also effective to drive the member 75. As can be seen from Fig. 7, the drive for the drum 75 is effected from the member 55 through the spring 84, the finger 79 on the drum 75 being out of engagement with the lining 62 on the band 46 so long as the torque transmitted is insufficient to stretch the spring. This is a condition which exists when the drum 75 is not engaged by the upper clutch band and is free to rotate. When the upper clutch band 116 engages the drum, since this band is connected to the sleeve 9 which carries the receptacle, it connects a load to the drum 75 which, being a dead load, stops the drum; the band 46 and the member 55 continue to rotate, however, stretching the spring 84. Since the arm 78 stands still and the band 46 and member 55 are rotating, the finger 79 on the drum 75 engages the end of the lining 62 and causes a force to be exerted on the end of the band 46 which stretches the spring 70 and loosens the frictional engagement of the band with driving drum 45. The band being disengaged from the lower drum stops. The result is that the band 46 causes some turning pressure to be applied to the finger 79 which actually causes the drum 75 to turn depending on the amount of residual frictional engagement of the band with the lower drum.

This can be better understood if a condition be assumed wherein the spring 84 is eliminated and only the spring 70 remains. In this case, the entire drive for the drum 75 would be through the end of the band opposite to the loop 65 against the finger 79. In this case, if the load connected to the drum 75 was too great, the finger 79 would merely hold the band 46 sufficiently released so that the lower clutch would slip. The driving force for the drum would, therefore, in this assumed case, be a function of the tension on the spring 70. The greater the tension exerted by the spring, the more driving force provided because of the increase in friction.

It appears, therefore, that two conditions exist, namely, when the shaft 11 alone is being driven, the drive is effected through the loop end of the band, and the other when the sleeve 9 is being rotated, the drive is through the other end of the band. In the first case, the drive tends to increase the frictional engagement, and in the second case to decrease the frictional engagement. It can be understood that in some instances there may be cases where the spring 84 is completely eliminated and only the spring 70 used.

The use of the spring 84 is desirable, however, because it provides for a more constant operation than can be effected by the use of the spring 70 alone. The conditions under which a device of this character operates are extremely varied due to the changes in temperature and humidity. The greatest effect of these changes is noticed in the frictional engagement of the clutch lining with the drum. In other words, exactly the same mechanism may transmit 10 pounds of torque one day and the next day, due to a change of temperature or humidity, it will transmit 50 pounds torque. This condition is undesirable because it might cause too much load to be applied to the motor and stall it.

Therefore, by providing a spring 70 of just sufficient strength to hold the band in place to make the servo action effective when driving the shaft 11 and by providing a spring 84 through which the torque is applied to the sleeve 9 the above mentioned variables have no effect. Thus the drive from the end of the band to the finger 79 is shifted so that the torque is applied through the spring 84 which is of such strength that if the starting load is too great, the spring 84 stretches and the arm 79 causes the clutch to slip until that load is placed in motion. With this arrangement, although some of the drive for the drum 75 is through the end of the band opposite the loop 65, the majority of the load is through the spring 84 and the arm 79 exerts a controlling action on the lower clutch band. This allows me to use ordinary brake lining for the clutch band and eliminates the need for careful selection of a lining that would not be effected by the aforementioned variables.

The agitator 5 and receptacle 4 may be removed for cleaning and/or repaired in a minimum of time. This is possible since the foregoing construction provides for ready disassembly and reassembly of the agitator and receptacle from or with the rest of the washing machine. This may be better appreciated when it is borne in mind that the agitator and receptacle are anchored against upward displacement from the power transmitter 2 by the threaded connection between socket 52 and shaft end 53. Thus the agitator may be removed from association with the receptacle by removing the screws 190 and ring 194, after which by turning the agitator in the direction of the rotation of shaft 11, the shaft is unscrewed from the socket 52. The shaft, being thus disengaged from the socket, and agitator may be readily lifted out of their places. Afterward, the receptacle and shaft 5 may be readily lifted from the support of pins 101, the tube 5 being slid through the bearings 43 and 44.

Figure 13:
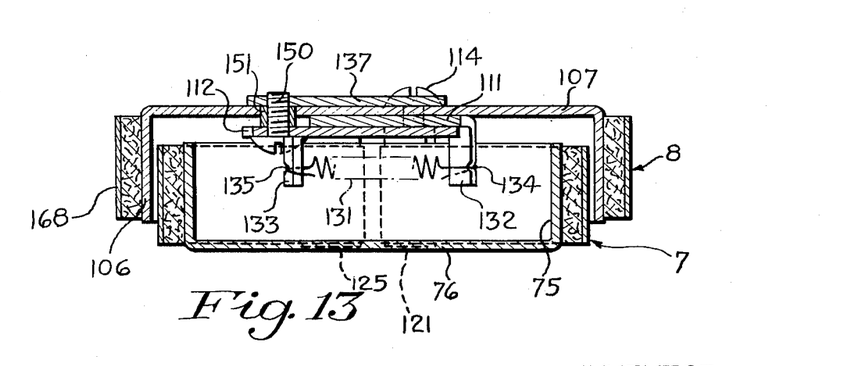
Fig. 13 is a vertical section taken on line 13—13 of Fig. 12.

Novel support is employed for a drivable member or clutch band 105 of the clutch 7 (Fig. 9). Such support is adopted in order that the agitator may be driven while the receptacle is held against rotation during washing. Additionally, the support provides for driving both agitator and receptacle together during the process of removing liquids from the clothes by spinning the receptacle. In brief, the drivable member 105 in the form of a clutch band is connected to the adapter 96 and the brake 8. Among the details of construction is included a rotary brake member or drum 106 having a web 107, closing the upper end of the drum. The web 107 has a central hole 108 therein, to accommodate the extension 103 of the adapter 96. This provides for rotatably supporting the brake drum 106 in concentric relationship to the clutch drums 45 and 75. Additionally, the adapter includes a shoulder 109 (Fig. 5), from which the web 107 is spaced by a clutch arm 111 and an adapter arm 112. The arm 111 has a hole 113 therethrough, to accommodate the extension 103 of the adapter 96. Arm 111 may be attached to the web 107 in any convenient manner such as by a screw 114, passing through the web 107 and threaded in the arm 111 (Fig. 13). The arm 112 is also provided with an aperture 115 to accommodate the extension 103 of the adapter 96 to which the arm is rigidly connected in any convenient manner, such as by welding. The band 105 includes a circular band of resilient metal 116, to which is conveniently fastened a lining 117 of suitable fibrous material to effectively provide friction with the drum 75, when the band 116 is tensioned about the drum. Additionally, the respective extremities of the band 116 are bent inwardly, then backwardly of themselves thereby providing hooked portions 118 and 119. The arm 111 terminates in a downwardly extending finger 121, which is received within the hooked portion 118 of the band 116. The finger 121 is additionally anchored to the hooked portion 118 by means of rivets 122, passing through holes 123 in the band and holes 124 in the finger 121. The arm 112 has a downwardly extending finger 125 which is grasped by the hooked portion 119, and secured in place by rivets 126.

Means is provided to normally maintain the drivable member 105 (Fig. 9) substantially at right angles to the axis of the adapter 96. That this may be carried into effect, the arm 112 includes an extension 127 (Fig. 9) adapted to limit upward displacement of the member 105 relative to the drum 75. If desired, the finger 125 may be bent slightly toward the axis of the adapter 96 to bias the band 116 substantially toward the extension 127.

The drive from the drum 75 through the clutch 7 to the adapter 96 (Fig. 5) is effected by urging the ends 121 and 125 of the arms 111 and 112 toward each other by a tension spring 131 (Fig. 12), the force of which causes the band 116 to be tightened about the drum 75. As a matter of detail in anchoring the spring 131, so that it may be under tension, a lug 132 extends downwardly from the arm 111, while another lug 133 extends downwardly from the arm 112. The ends of the spring 131 are hooked about the respective lugs in notches 134 and 135 (Fig. 13).

Means is provided to overcome the force of spring 131 (Fig. 12) in order that clutch 7 may be disengaged during operation of the agitator and to prevent spinning the receptacle, this being effected by holding the arms 111 and 112 apart, against the force of spring 131 by a latch mechanism 136. The latch mechanism comprises a latch plate 137 and a latch arm 138, cooperatively associated with the latch plate. The latch plate is of generally rectangular conformation and is provided with a central opening 142 to accommodate the extension 103 of the adapter 96, the plate resting on top of the drum 107. One corner of the plate is removed to provide an oblique edge 139, which is provided with a notch 141, for cooperation with the latch arm 138. The latch arm is pivotally secured to the web 107 by a screw 143 and has an end portion 144 extending angularly from the part 138. The arm 138 is adapted to hold the latch plate 136, the notch 141 receiving a corner of the end section 144. This holding engagement is further effected by a spring 145, attached to a lug 146, on the latch arm, and a lug 147 on the latch plate, which spring 145 biases the section 144 toward the latch plate at all times allowing the section to snap into the notch 141 whenever the notch is moved to the corner of section 144.

The latch plate 137 is disposed above the web 107, with which it is intimately associated and is rigidly coupled to the arm 112 below the web. The latch plate is, however, rotatable relative within predetermined limits to the web 107, to provide for latching and unlatching. This connection is made through arcuate slots 148 and 149 in the web 107 (Figs. 11 and 12) spaced from the extension 103 and diametrically opposite each other. The latch plate 137 and arm 112 are secured together by screws 150 that pass through slots 149 and are held in spaced relation by collars 151 and 152 about the shanks of the screws. The length of the respective collars is slightly greater than the combined thickness of the web 107 and arm 111 since it is essential that there be no binding action between the latch plate, arms and web. It will, therefore, be apparent that whenever the latch plate 137 is rotated counterclockwise from the position indicated in Fig. 12, and relative to the arm 111, the rotation is against the resistance of spring 131. When the rotation of the arm 112 is through wide enough an arc, the end section 144 engages the notch 141 as in Fig. 11. Thus the latch arm 138 holds the clutch 7 in open position by relieving the tension in the band 116. The clutch is engaged by releasing the latch mechanism and disengaged by relative movement between the parts to which the latch parts are carried, which relative movement also "cocks" the latch mechanism and holds the clutch disengaged until the latch mechnaism as released. Normally, during the process of agitation, the receptacle is prevented from turning by the brake 8.

Means is provided to release the brake which allows the receptacle to turn and causes the release of the latch mechanism which actuates the clutch 7 to drivingly couple the drivable member 105 to the drum 75, so that the receptacle 4 may be freely rotated. In order that this operation may be understood, a more comprehensive explanation of the brake 8 is desirable. Therefore, reference should be made to Figs. 1 and 5 wherein it will be noted that the stationary support 39 carries, at the lower extremity thereof, a bracket 154 connected to the support in any suitable manner. The bracket 154 may be substantially triangular in form having an extremity 155 thereof bent downwardly and terminating in a finger 156. At the side thereof, opposite the extremity 155, the bracket includes an upstanding flange 157, to which is conveniently attached a solenoid 158. Adjacent the front of the bracket (Fig. 1) a bell-crank lever 159 is pivotally connected to the bracket on a screw 161 which extends through the lever and is threaded into the bracket.

The solenoid has an armature 162 to which the bell-crank lever is attached by a link 163.

The link may be pivotally coupled to the armature by a rivet 164 and also pivotally coupled to the lever 159 by a screw 160. Additionally, the link 163 is bent downwardly over the edge of lever 159, to provide a cam 165. The latch arm 138 (Fig. 11) has an upturned lug or follower 138', adapted to engage the cam 165. When the solenoid is de-energized, the cam 165 is not in the orbit through which the follower 138' is carried due to the biasing effect of a tension spring 166 that tends to rotate the bell-crank lever counter-clockwise. The manner in which the spring is anchored to its supports and coupled to the bell-crank lever will be described hereinafter. It will thus be apparent that only when the solenoid 158 is energized, and the armature drawn therein, is the cam 165 in position to engage the follower 138' on the latch arm to release the latch. When the follower 138' is, however, operatively carried through the orbit into which the cam is drawn, by the solenoid, the latch arm is rocked about its pivotal point and out of holding engagement with the notch 141, thereby permitting the ends of arms 111 and 112 to snap together by force of spring 131.

Figure 11:
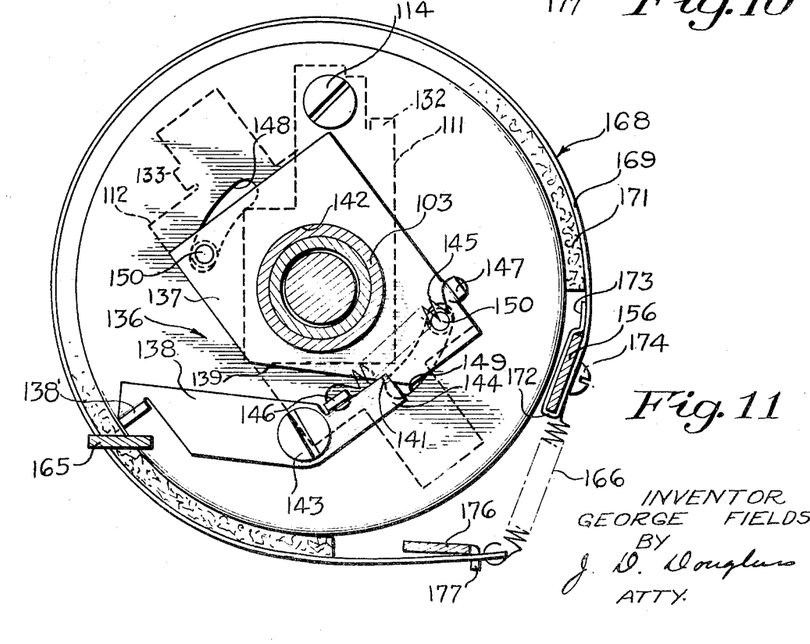
Fig. 11 is a section on line 11—11 of Fig. 5 to show the brake and latching mechanism carried thereby.
Figure 12:
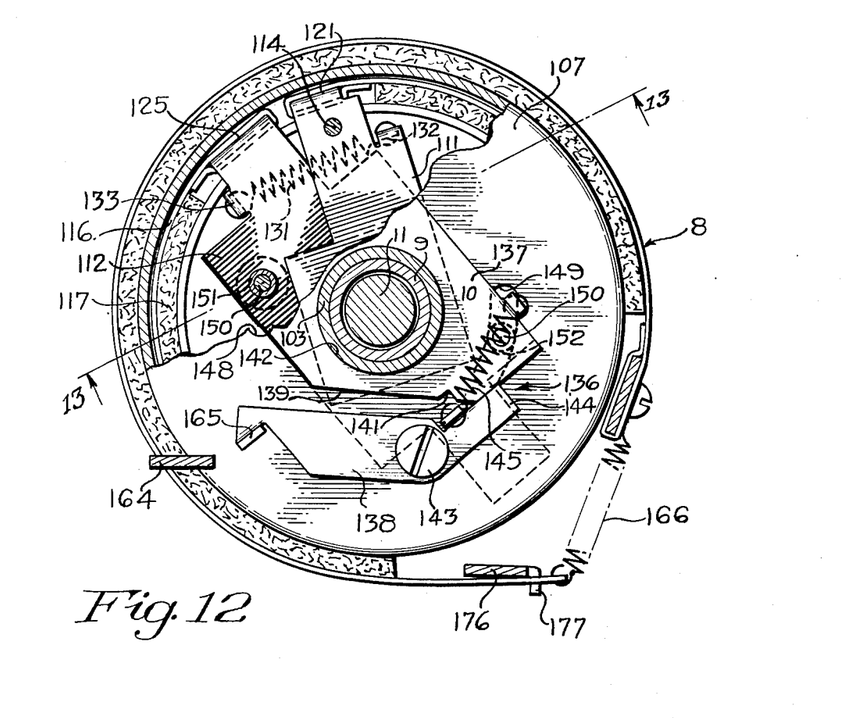
Fig. 12 is a section taken on substantially the same plane that Fig. 11 is taken on, the web of the brake member being partly broken away to show the coupling means, including clutch and clutch arms connecting the driving and driven upper clutch members.

The operation of the clutch 7 is substantially coincident with the release of the brake 8. This will be appreciated when it is borne in mind that the spring 166 normally keeps the cam 165 from the orbit of the follower 138'. However, the spring 166 also normally prevents the latch arm from being carried into engagement with cam 165 since tension of the spring causes friction between the drum 106 and a stationary brake band 168, embracing the drum. In detail, the band 168 comprises a band 169 of resilient metal and a suitable brake lining 171 conveniently attached to the band. Toward one extremity thereof the band is rigidly supported by being looped about the finger 156 at 172 and its end rigidly fastened to itself at 173, as indicated in Figs. 11 and 12. Additionally, this extremity of the band is anchored against displacement by a screw 174, passing through one side of the looped portion 172 and threaded in the finger 156.

The bell-crank lever 159 includes a portion 175 which extends substantially beyond the periphery of the brake drum 106 and terminates in a finger 176, extending downwardly. Laterally thereof the finger has a lug 177 bent outwardly. The free end of band 169 is provided with an aperture 178 proportioned to accommodate the lug 177 to which this end of the band is thus hooked. The aperture 178 is further notched at 179 (Fig. 1) so that one end of the spring 166 may be hooked therein and may resiliently anchor the band to the finger 156, the remaining end of the spring being hooked under the head of screw 174.

Means is provided to release the brake drum 106 so that it can rotate and to unlatch the latch means 136 to cause engagement of the clutch. Since rotation of the drum 106 through less than one revolution will effect this operation, initial rotation of the drum will, for the sake of convenience, be considered as the motion of the drum through whatever arc the latch arm is carried from the time the brake is released to the time when the clutch 7 is applied regardless of the position of the drum and the latch arm at the time the brake is released. During the initial rotation of the receptacle, which is a dead load at the start, the possibility of stalling the motor at the start or during the extraction operation is avoided by causing the lower clutch 6 to slip.

The upper clutch 7 is normally held in a disengaged position by the latch means and is not released until the latch is tripped by a rotation of the brake drum 107 sufficient for the follower 138' to engage the trip lug 165. Upon release of the brake, the receptacle will gradually turn sufficiently to provide the initial rotation of the drum necessary to effect the release of the latch. This rotation may be present because of the friction of the shaft 11 which is being continuously driven; however, should this friction be insufficient to cause the initial turning, additional turning effort is afforded to the receptacle which is communicated to the drum through the forces acting in the agitator.

The agitator mechanism is specifically disclosed in my copending application before mentioned. In Figs. 1 and 2, it will be noted that the agitator 5 is coupled to the shaft 11 by means including a crank 181 and pitman 182. Keyed to the shaft 11 is a worm 183, in mesh with a worm gear 184. Since the crank and worm gear are keyed to a shaft 185, continuous rotation of shaft 11 is thereby translated into reciprocatory motion of the agitator 5, which is oscillated diametrically of the receptacle 4. Additionally, the worm 183 and worm gear 184 are mounted in a rotary housing 186, preferably of some non-corrosive metal. The housing 186 is adapted to rotate intermittently about the shaft 11, and an agitator dome 187 coupled to the housing 186, by means not shown, is also carried about shaft 11 after a fashion, later to be described.

The tendency of the housing 186 to turn is communicated to the receptacle 4, but the sleeve 9 which is rigidly connected to the receptacle is prevented from turning by the brake. This tendency of the housing to turn the receptacle is communicated to the receptacle by a friction coupling 188, to provide initial rotation for the receptacle and the brake drum 106 when the brake is released. The friction coupling 188 includes a socket plate 189 disposed in coaxial relationship to the shaft 11. The socket plate has an annular recess 192 therein to accommodate a friction ring 193 which is restrained from displacement from the recess by a washer 194, the inside diameter of which is substantially less than the diameter of the recess 192. The washer 194 and socket plate are bolted to a lower horizontal wall 195 of the receptacle 4. The friction ring 193, on the other hand, is clamped to a flange 196 on the lower extremity of housing 186 by screws 197.

As disclosed in my copending application, the helix angle of the worm 183 is so great that when driving the worm wheel 184, there is a substantial component of force exerted downward on the worm wheel. This component is communicated to the housing 186 by the shaft 185. At the same time, there is a component of force exerted by the worm on the worm wheel tending to move the worm wheel around the axis of the worm. I, therefore, take advantage of these forces to provide rotary motion of the housing 186 and agitator 5 during the process of washing clothes. Additionally, I take advantage of these forces for imparting initial motion to the brake drum 106.

The friction coupling 188 is susceptible of a plurality of functions. They differ when the receptacle 4 operates for washing, for extraction and during the period of initial rotation of brake drum 106 when the operation of the receptacle 4 is shifting from washing to extraction. During the short period of initial rotation that the latch arm 138 passes through, there is a state of driving relationship between the ring 193 and the plate 189, owing to the friction therebetween.

Due to the friction between the plate and ring during washing, the agitator moves around the plate 189 since it, with the receptacle 4, is held stationary by the brake 8. This rotation of the agitator is by varying increments due to the variations of resistance occasioned by clothes in the receptacle as the agitator reciprocates throughout its many strokes during a single rotation. Therefore, it will be apparent how there is considerable intermittent slippage between the ring 193 and plate 189 during the operation of washing. During extraction, the ring 193 and plate 189 rotate together, since the sleeve 9 and shaft 11 are drivingly coupled to each other by the clutch 7.

When the latch is tripped, causing the clutch band 105 to engage the drum 75, the full load of the receptacle and its contents is applied to the drum 75. The sudden load applied to the drum 75 stops the drum in its rotation. As previously stated, the drive for the drum 75 is through the hub 49 and lower drum 45 to the band 46; and the band 46 is connected to the arm 56 of the adapter 96. This band is held in frictional engagement with the band initially by the spring 70 and obtains its real gripping power due to its self energization, the friction of the band tending to tighten the band around the drum. These parts all continue their movement momentarily after the engagement of the drum 75. Immediately after engagement of the drum 75, which is locked by the band 105, the end of the lining 62 on the band 46 strikes the arm 79, which causes the band to be released from the drum allowing the drum to rotate freely of the band which at that time is substantially at rest.

The spring 84 stretches during this period but immediately pulls the member 55 and the arm 78 back toward the position shown in Fig. 7 whereupon the clutch starts to frictionally engage the drum. The result is that the lower clutch slips and only provides engagement determined by the strength of the spring 84. The load in the motor is, therefore, determined by the spring 84 which prevents the motor from being overloaded. The clutch 6 therefore gradually brings the sleeve 9 and shaft 11 up to the same speed as the shaft 3 wherein the sleeve and shaft are rotating together and the parts take the position illustrated in Fig. 7. It will be noted that at this time full driving power is applied to the rotating receptacle, but that should anything occur to cause the load to suddenly increase requiring more power, the spring 84 will stretch again preventing overloading of the motor until the load is again in motion. I have found that a spring 84 having a tension of ten pounds operates very satisfactorily. I have also found that if the spring is too heavy, the motor can be made to stall, and that if it is too light, the receptacle cannot be made to rotate. Therefore, the loading of the clutch can be varied between relatively wide limits determined by the strength of the spring 84.

The extraction cycle is governed by the solenoid 158. When it is energized, washing ceases and the receptacle 4 is spun at an elevated speed. When the solenoid is de-energized, the extraction ceases and the agitator begins the motions it goes through in washing. Throughout the intervening extraction period, the solenoid is energized. During this period, the brake member 168 is, of course, disengaged from the drum 106, since the drum and receptacle are coupled to each other through the elements previously referred to including the spring 131. Upon the de-energization of the solenoid, the brake member 168 grasps the brake drum 106, and the inertia of the receptacle and its contents rotating at an elevated speed causes the arm 112 to move away from arm 111, against the resistance of spring 131 until the latch 138 re-establishes holding engagement with the latch plate 137 by snapping into engagement with the notch 141. At this time, as the arms 111 and 112 are moved apart, and so held, the clutch 7 is released thereby enabling the clutch drum 75 to rotate while the clutch member 105 is held stationary.

The receptacle soon comes to rest, at which time the agitator is operating in the manner previously described.

It should be noted that separate controls for controlling the agitator and the receptacle are not necessary since, while the machine is being filled, the motor can be shut off, and during centrifuging, since the sleeve 9 and shaft 11 are coupled together, there is no relative movement therebetween, and the agitator merely rotates with the receptacle without partaking of its transverse motion across the receptacle. Therefore, the only control needed is the one which starts the motor which causes the agitation and a control to cause the energization of the solenoid, which starts and stops the extraction.

Having thus described my invention in an embodiment thereof, I am aware that numerous and extensive departures may be made therefrom without departing from the spirit or scope of my invention.

I claim:

1. An apparatus of the class described comprising a driven shaft and driven sleeve and means for providing cooperation between said shaft and sleeve including a first clutch in association with said shaft, means to normally provide a state of constant drivability through the clutch, a second clutch in association with the driven sleeve and the first clutch, resilient means to resist angular movement of the second clutch relative to the first clutch, said first clutch being adaptable of varying drivability in response to mechanical impulses imparted thereto from said second clutch, said second clutch including a driven member and a driving member, interlocking means to releasably hold said members apart, control means to release said interlocking means, and means to urge said members together when released by said interlocking means.

2. An apparatus of the class described comprising a driving shaft and first and second driven shafts and means adaptable for communicating torque from said driving shaft to said driven shafts comprising a first clutch in association with said first driven shaft, means to normally provide a state of constant drivability through said first clutch, a second clutch in association with the second driven shaft and the first clutch, resilient means to resist angular movement of said second clutch relative to said first clutch, said first clutch being adaptable of varying drivability in response to motion imparted thereto by said second clutch, said second clutch including a driven member and a driving member, resilient means to urge said members together, interlocking means to releasably hold said members apart, control means in association with said interlocking means, said interlocking means being adapted to operate in response to operation of said control means to release said resilient means and allow said resilient means to establish a state of drivability through the second clutch.

3. An apparatus of the class described comprising a driving shaft and first and second driven shafts and means adaptable for communicating torque from said driving shaft to said driven shafts including a first clutch in association with said first driven shaft, means to normally provide a state of constant drivability through said first clutch, a second clutch in association with the second driven shaft and the first clutch, said first clutch being adaptable of varying drivability therethrough in response to operation of said second clutch, said second clutch including a driven member and a driving member, resilient means to resist angular movement of one of said members relative to said first clutch, resilient means to urge said members together, a brake associated with said second driven shaft, control means to operate said brake, interlocking means associated with said brake and arranged to hold the second clutch open, said interlocking means being adapted to operate in response to operation of said control means to allow engagement of said second clutch member.

4. An apparatus of the class described including a drive member, first and second driven members, clutch means connecting said drive member and the first driven member and including friction means having the first driven member connected to one end to afford a positive drive therefrom and having the second driven member engaging the other end to afford a drive which when subject to a predetermined overload will allow slippage between said drive member and said clutch means.

5. An apparatus of the class described comprising a drive member, a first driven shaft and a second driven shaft, a first clutch means connecting said drive member to the first shaft and a second clutch means connecting said drive member to the second shaft through the first clutch means, finger means on said second clutch engaging said first clutch to effect control of the first clutch.

6. An apparatus of the class described comprising a driving means, a first driven means and a first clutch connecting the driving and driven means, a second driven means and a second clutch connecting said first clutch to said second driven means, and finger means on said second clutch operatively engaging said first clutch to allow slippage of the first clutch upon engagement of the second clutch.

7. An apparatus of the class described including a drive member and first and second driven members, a first clutch means connecting the drive member to the first driven member and a second clutch means connecting said second driven member to the drive member through the first clutch means, brake means for the second driven means and means connected to said brake and second clutch to operate the same and means on the second clutch engaging the first clutch to effect control of the first clutch upon operation of the second clutch.

8. An apparatus of the class described including a drive member and first and second driven members, a first clutch means connecting the drive member to the first driven member and a second clutch means connecting said second driven member to the drive member through the first clutch means, brake means for the second driven means and means connected to said brake and second clutch to operate the same and means engaged between the first clutch and the second clutch and operable upon relative movement between portions of the two clutches to allow slippage of the first clutch until the amount of relative movement is decreased below predetermined limits.

9. An apparatus of the class described including a drive means and a first and second driven means, a first clutch means connecting said drive means to said first driven means and a second clutch means connecting said second driven means to said drive means through said first clutch, said first clutch including a drum, a friction band driven by the drum and shaft supporting means driven by said band, said second clutch including a drum and having first clutch controlling means extending into engagement with said band, spring means connecting said second clutch drum and said shaft supporting means for holding said control means out of engagement with the band and operable upon the application of a load to the second drum to allow the control means to engage said band and control the frictional engagement thereof.

10. In a washing machine including a rotatable container for holding clothes and washing fluid and for centrifuging the fluid from said clothes, and agitator means disposed within the container for agitating the clothes and washing fluid; operating means for said washing machine including a gear housing rotatably mounted in the container and agitator operating mechanism carried thereby, a drive shaft for said agitator mechanism connected thereto and a drive shaft connected to said container, a first clutch on said first named drive shaft, a second clutch connecting said first clutch to said container shaft, brake means engaging said container shaft to hold said container against movement and cause said agitator to agitate, and means on said brake means to release said holding means and engage said second clutch to simultaneously drive the container and agitator shafts said agitator operating mechanism being adapted to operate only when there is relative rotation between said shafts, and means on the second clutch engaging said first clutch to decrease the driving engagement of the first clutch when said shafts are operating at different speeds.

11. An apparatus of the class described comprising a drive member and first and second driven members, a first friction clutch connecting said drive member to the first driven member, a second friction clutch connecting said second driven member to said drive member through said first clutch, said first clutch including a clutch drum and a clutch band for frictional engagement therewith and said second clutch having means for engagement with said clutch band adapted to release the engagement of the band with the drum, said second clutch including a drum and a clutch band for engagement therewith, means to cause frictional engagement of said second band with said drum and latch means for holding said band out of engagement with said drum, brake means for holding said second driven member against movement, and means for releasing said brake means and said latch means, said latch means adapted to be latched upon energization of said brake means.

12. An apparatus of the class described comprising a main drive member, a clutch drum forming a part of the drive member, a first driven member including a clutch band disposed for frictional engagement with said drum, means for supporting said friction band attached to one end of the band, spring means normally holding said band in operative engagement with said drum, a first driven shaft connected to and rotatable with said support, a second drum, spring means connecting said second drum with said friction band support, means connected to said second drum disposed for engagement with the said band to cause release of said band from frictional engagement upon relative movement between the two drums, a second friction band for frictional engagement with said second drum and means connected to the ends thereof and including independent members connected to opposite ends of the second band, a second driven shaft connected to and rotatable with one of said members, said members arranged for limited relative movement to each other, spring means connected to said second band to hold it in engagement with the second drum, a brake drum rigidly connected to one of said driven members, and latch means carried by said drum for locking engagement with said members to hold said second friction band in disengaged position, a brake band disposed for engagement with said brake drum and spring means connected to the ends of said brake band to apply said brake, means connected to the brake band for releasing said brake and having cam means for engagement with said latch to release said latch and allow engagement of said second friction band.

13. An apparatus of the class described comprising a drive member, a clutch drum forming a part of the drive member, a first driven member including a friction band disposed for frictional engagement with said drum, means for supporting said friction band having an arm attached to one end of the band, spring means for normally holding the free end of said band in engagement with said drum, said supporting means having a first driven shaft connected to and rotatable therewith, a second drum coaxial with the first drum, spring means connecting said second drum with said friction band support, an arm on said second drum disposed for engagement with the said band near the free end thereof, a second friction band disposed for frictional engagement with said second drum, means to support said second friction band connected to the ends thereof and including a first member connected to one end of the band, a second shaft connected to and rotatable with said member, a second member connected to the other end of the band and arranged for limited relative movement to the first member, spring means connected to said members near their point of connection to the band, a brake drum rigidly connected to said second member, and latch means carried by said drum for locking engagement with said members to hold said band in disengaged position, a brake band disposed for engagement with said brake drum and spring means connected to the ends of said brake band to apply said brake, solenoid operated means for releasing said brake and having cam means for engagement with said latch to release said latch.

14. A transmission mechanism comprising a driving shaft and first and second driven shafts, means to transmit torque from the driving shaft to the first driven shaft comprising a first clutch, means normally in position to provide for constant driving relationship between said driving shaft and first driven shaft through said clutch, a second clutch, engaging said first clutch and in association with said second driven shaft, adapted to convey a varying force dependent on the load to vary the amount of slippage in the first clutch while taking up a load.

15. A transmission mechanism comprising a driving shaft and first and second driven shafts, means to transmit torque from the driving shaft to the first driven shaft comprising a first clutch, a second clutch in association with said second driven shaft, means normally in position to provide for constant driving relationship between said driving shaft and said first driven shaft through said clutch comprising means on said second clutch engaging said first clutch adapted to convey movements of said second clutch relative to said first clutch to release said first clutch partially upon increasing load, thereby permitting gradual taking up of the load.

16. A transmission mechanism comprising a driving shaft and first and second driven shafts, means to transmit torque from the driving shaft to the first driven shaft comprising a first clutch having a driving member on said driving shaft, and a driven member, means engaging said members normally in position to provide a constant driving engagement therebetween, a second clutch engaging said first clutch and said second driven shaft adapted to impart impulses to said first clutch to vary the driving engagement of the first clutch.

17. A transmission mechanism comprising a driving shaft, a driven shaft and a driven sleeve surrounding said driven shaft, means to transmit torque from said driving shaft to said driven shaft and sleeve comprising a first clutch having a driving member and a driven member, coupling means coupling said driving shaft to said driving member, means normally in position to provide a driving relationship between said driving member and said driven member, and means releasably coupling the driven sleeve to the first clutch and adapted to affect the first clutch to vary the slippage between said driving and driven members.

18. A torque transmitting mechanism comprising a pair of clutches, a driven shaft associated with the first clutch and a driven sleeve associated with the second clutch, said first clutch including a driving member and a driven member normally in driving engagement, resilient means between said first clutch and said second clutch to resist relative angular movement between said clutches, means on the second clutch engaging one of the members of the first clutch to vary the driving engagement in said first clutch.

GEORGE FIELDS.

REFERENCES CITED

The following references are of record in the file of this patent:

UNITED STATES PATENTS

| Number | Name | Date |
|---|---|---|
| 819,421 | Gramm | May 1, 1906 |
| 833,839 | King | Oct. 23, 1906 |
| 1,561,537 | Hayes | Nov. 17, 1925 |
| 2,023,198 | Fishburn | Dec. 3, 1935 |
| 2,105,218 | Kirby | Jan. 11, 1938 |
| 2,109,620 | Kirby | Mar. 1, 1938 |
| 2,182,926 | Manz et al. | Dec. 12, 1939 |
| 2,301,046 | Henderson | Nov. 3, 1942 |
| 2,331,897 | Dyer | Oct. 19, 1943 |
| 2,346,669 | Dunham | Apr. 18, 1944 |
| 2,482,253 | Etten | Sept. 20, 1949 |

FOREIGN PATENTS

| Number | Country | Date |
|---|---|---|
| 143,418 | Great Britain | May 27, 1920 |